United States Patent [19]

Siegel

[11] Patent Number: 5,339,645

[45] Date of Patent: Aug. 23, 1994

[54] SOLAR HOT WATER COOLING SYSTEM

[76] Inventor: Israel Siegel, 2980 Point East Dr., Apt. D-612, N. Miami Beach, Fla. 33160

[21] Appl. No.: 905,669

[22] Filed: Jun. 29, 1992

[51] Int. Cl.$^5$ ............................................. F25B 1/02
[52] U.S. Cl. .................................... 62/235.1; 62/268; 417/209; 165/104.27
[58] Field of Search .................... 165/104.27; 62/268, 62/235.1; 417/207-209

[56] References Cited

U.S. PATENT DOCUMENTS 2,114,316  4/1938  Randel ................................. 62/268
5,186,242  2/1993  Adachi et al. ........................ 62/268

Primary Examiner—Albert W. Davis, Jr.

[57] ABSTRACT

The invention consists of a cooling system which can be powered by solar energy, utilizing solar flat plate collectors. Water, the boiling point of which has been lowered by an air vacuum, is used as a refrigerant instead of freon. The water boils at low temperature in sealed air evacuated heat exchange coils and removes heat from the environment. A solar differential temperature engine is modified to include a pump mechanism. The pump is used to transfer the vapor, generated by the boiling of the low boiling point water in the heat exchange coils, from the coils to the chambers of the differential temperature engine. The vapor then re-condenses into a liquid, without a compressor, through the differential temperature between the chambers of the engine. The re-condensed liquid then returns spontaneously to the heat exchange coils by force of gravity. The cooling system may likewise operate through house hold electic power on a standby or permenant basis.

11 Claims, 2 Drawing Sheets

SOLAR HOT WATER COOLING SYSTEM

The invention relates to cooling systems and in particular to solar cooling systems. The production of hot water through solar flat plate collectors have proved to be practical and are now in current use in many countries. The hot water which is heated in the flat plate collectors is usually stored in hot water tanks which communicate with the collectors. The utilization of solar hot water tanks for the production of work has been previously described by the present inventor in U.S. Pat. No. 4,135,366. One objective of the present invention is to devise a system which can use the energy in the solar hot water tanks to power cooling systems. An additional objective is to devise a cooling system which can utilize water, instead of freon, as a refrigerant. An additional objective is to devise a compression type cooling system which operates through a pump without a compressor.

SUMMARY

The invention utilizes hot water collected from solar flat plate collectors to power a solar cooling system. The cooling system includes sealed inter-communicating heat exchange coils containing an air vacuum. Inside the coils there is water which boils at low temperatures under the air vacuum. The water acts like a refrigerant and removes heat from the coils and their surroundings. The vapor generated by the boiling water must be removed from the sealed coils to avoid a vapor back pressure which would stop the boiling of the water. This is accomplished by integrating the coils with a modified solar temperature differential engine. The modified differential temperature solar engine consists of a relatively hot and a relatively cold chamber. The relatively hot chamber is heated by immersion in a hot water storage tank which collects hot water from solar flat plate collectors. The cold chamber is placed above the hot chamber outside of the hot water tank. A canopy shields the cold chamber from direct sun light. A low boiling point liquid, which is of the same type as the liquid in the heat exchange coils, is present in the hot chamber. A vertical tube is immersed at one end in the liquid in the hot chamber while the vertical tube's other end communicates with the cold chamber. A float is present in the vertical tube and moves up and down in response to the liquid level in the vertical tube. A bellows chamber is placed above the float. The bottom wall of the bellows chamber is fixed while the top wall of the bellows chamber alternates between a low and a high position, in response to the movements of the float. The temperature differential between the hot and cold chamber causes the vapor in the hot chamber to exceed the vapor pressure in the cold chamber. This causes the liquid levels in the vertical tube to increase and lift the float. When the float rises it pulls the top wall of the bellows chamber upward. This causes the float to change from a folded to an to an extended position and to draw vapor from the heat exchange coils into the bellows chamber through a communicating pipe and a one way valve arrangement. Another pipe and valve arrangement opens and closes a communication between the vapor phases of the hot and cold chamber. When the float reaches its upper limit of travel it opens the communication between the chambers. This causes the liquid level in the vertical chamber to descend and returns the bellows to its folded position. This closes the communication between the hot and cold chamber and renews the vapor pressure differential between the chambers and the cycle of operation. When the bellows changes from an extended to a folded position the vapor in the bellows chamber is pushed through a communicating pipe and a one way valve to the cold chamber. The vapor re-condenses into a liquid in the cold chamber and returns to heat the exchange coils, through a communicating pipe and a one way valve, by force of gravity. The cooling system can likewise operate, on a standby or permanent basis, through a standard electric heating system, or a standard electric pump mechanism.

DETAILED DESCRIPTION

Figure 1:
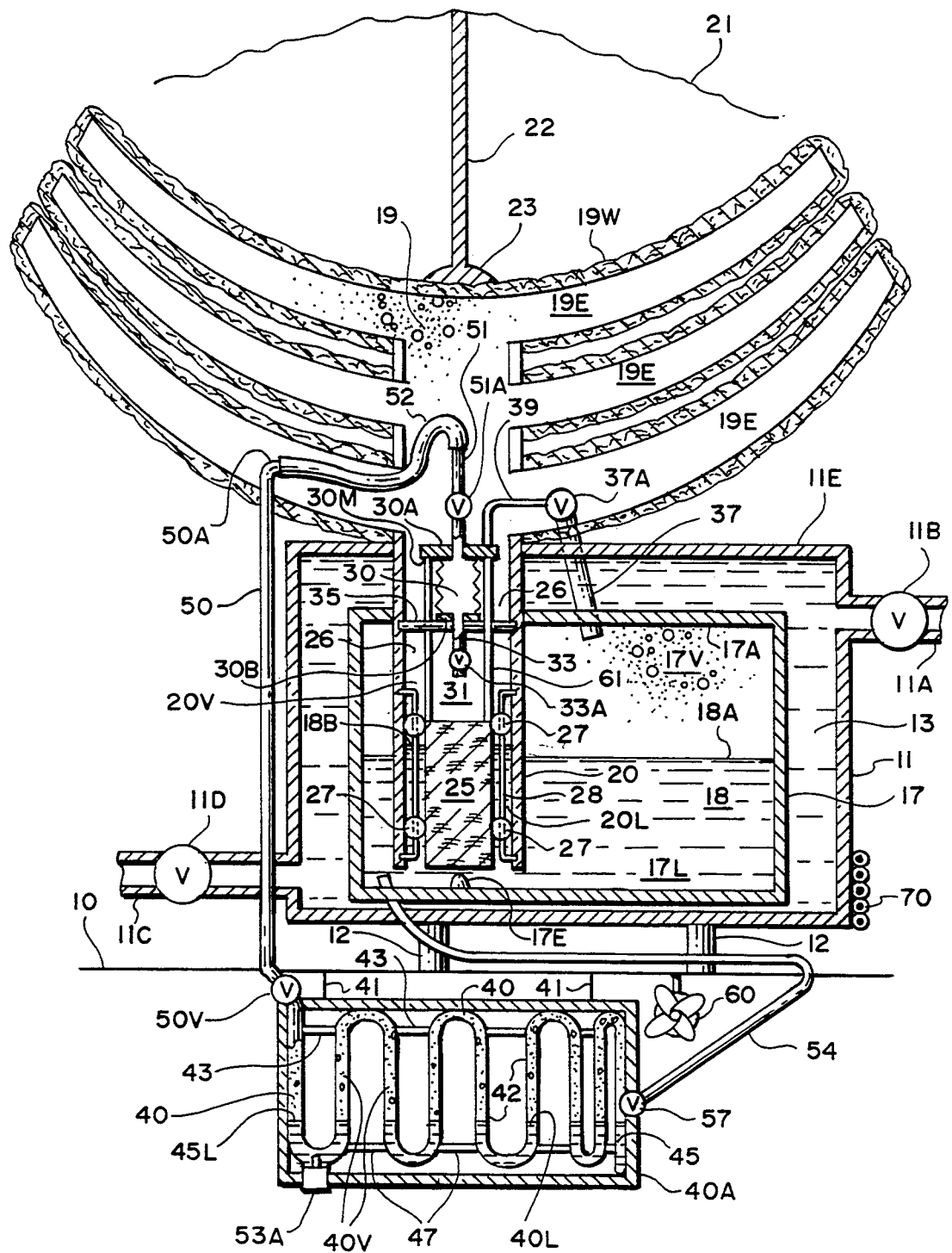
FIG. 1 is a cross-sectional view of a preferred embodiment of the solar cooling system.

Referring to the drawing there is shown in FIG. 1 a solar air conditioner embodying the present invention. As shown, a water tank 11 is supported by legs 12, on roof 10. The tank is adapted to receive hot water 13, which has been heated by standard solar flat plate collectors (not shown). The tank accumulates solar heated water and thus serves as a storage device for solar energy as will be described. To that end the tank is coated with an insulating material (not shown) to prevent the loss of heat from the tank. Inlet 11a and valve 11b connect water 13 in tank 11 with a central water supply (not shown), and outlet 11c and valve 11d connect water 13 in tank 11 with the home water supply (not shown).

Immersed in the hot water of the solar storage tank 11 is a chamber 17. The chamber functions as an evaporator chamber as will be described. Present inside chamber 17 is a low boiling point liquid 18 such as water under an air vacuum. The liquid defines a liquid level 18a, and divides evaporator chamber 17 into a liquid chamber portion 17l and a vapor chamber portion 17v.

Present inside evaporator chamber is tube 20. The arrangement is that tube 20 penetrates the top wall of chamber 17 into chamber 17. The length of tube 20 is such that its upper end extends to a level which is higher than the upper wall of chamber 17, while its lower end reaches a level which is close to the bottom wall of chamber 17. The upper open end of tube 20 forms a support to a condenser chamber 19 which is present above chamber 17. Thus, tube 20 forms a communication between condenser chamber 19 and evaporator chamber 17. The tube 20 forms a tight fit with the penetrated walls. Proper sealing material such as solder may be used. The bottom open end of tubes 20 dips in liquid 18 inside the evaporator chamber to define a liquid level 18b in tube 20. The liquid level 18b defines a liquid phase 20l and a vapor phase 20v in vertical tube 20.

The condenser chamber is divided into petal shaped compartments 19e. The insides of all compartments 19e drain into tube 20. The spacings between compartments 19e are designed to allow for a direct contact of the compartments with ambient air. The walls of chamber 19 are made of good heat conducting materials, such as aluminum to allow for maximal transfer of heat from the walls to the outside environment. Present on top of condenser chamber 19 is a canopy 21. The canopy is designed to minimize the exposure of condenser chamber 19 to direct sunlight. The canopy is fixed to the top of condenser chamber 19 by rod 22, which is glued to the top surface of chamber 19 through rod base 23.

Present inside the lower portion of tube 20 is a float 25. The float rests on bottom surface extension 17e of chamber 17. The relative dimensions of tube 20 and float 25 are such that there is a small inter-space 26 between float 25 and container 20. This allows an immersion of float 25 in inter-space 26 and a vertical movement of float 25 in tube 20. Suitable guide means are provided for maintaining the position of the float relative to tube 20. The guide means may consist of guide rings 27 connected to the side walls of float 25 to ride along guiding rods 28 connected to the inside side walls of tube 25.

Present in the upper portion of tube 20, is a flexible bellows chamber 30. The bellows chamber functions as a bellows pump, as will be described. A horizontal rod 35 is attached to the bottom wall 30b of bellows chamber 30 and to the inside walls of tube 20. This serves to fix the position of the bellows chamber and prevents a movement of the bottom wall of the bellows in tube 20. The position of bellows 30 is such that when float 25 is in its low position there is a gap 31 between the float and the bellows chamber. The gap provides space for the upward movement of the float as will be described. In contrast to the lower immovable wall 30b of the bellows chamber, the top wall 30a of the bellows chamber can move freely in a vertical direction in tube 20 and condenser chamber 19. This allows the bellows to alternate between an extended and a folded position. The cross section area of top wall 30a of bellows chamber 30 is larger than the that of the bellows chamber. This provides a top outside margin 30m around the bellows chamber. Present between float 25 and the top wall 30a of bellows chamber 30 are rods 61. The rods are attached to the top surface of float 25 and to the margins 30m of top wall 30a of bellows chamber 30. Rods 61 function to transmit the vertical movements of float 25 to top wall 30a. Thus, when float 25 moves upward rods 61 push the top wall 30a upwards. When the float 25 moves downward rods 61 and top wall 30a are pulled downward. The arrangement is that when the float is at its bottom position rods 61 pull bellows chamber 30 to a folded position. When the float moves upward it pushes the top wall 30a upward so that when float 25 is in its top position bellows chamber 30 is fully extended. The relative volumes of the float and the bellows chamber are such that the buoyant force exerted by the float can overcome all resistances to the extended position of the bellows chamber, as will be described in the numerical examples. Present on bottom wall 30b of bellows chamber 30 is an inlet tube 33 and valve 33a. Valve 33a in inlet tube 33 allows the exit of vapor or liquid out of bellows chamber 30, but prevents the entrance of vapor or liquid into the chamber. Tube 37 communicates between the vapor phase 17v of evaporator container 17, and the lower portion of condenser chamber 19. A valve 37a in tube 37 opens and closes the tube. An extension rod 39 from the top wall of float 25 opens valve 37a when the float reaches its highest limit of travel, and closes the valve when the float is in lower positions.

Present underneath roof 10, on an underside of a ceiling of the room cooled by the solar air conditioner, is a cooling heat exchange chamber 40. The chamber is placed in frame 40a which is attached to the room ceiling by rods 41. The rods provide an air space between chamber 40 and the ceiling. The arrangement is that chamber 40 is shaped to provide a high surface to volume ratio. For example, chamber 40 may assume a shape of multiple inter-communicating coils 42. Top conduits 43 between coils 42 provide a communication between the top portions of the coils. Bottom conduits 47 between coils 42 communicate between the bottom portions of the coils of chamber 40.

Present inside container 40 is a low boiling point liquid 45. The type of liquid used is similar to the liquid used in the evaporator chamber 17. This is required because of the inter-mixing of the liquids of the chambers during the operation of the cooling system as will be described. The liquid level 451 of liquid 45 defines a liquid phase 401, and a vapor phase 40v in chamber 40. A tube 50 communicates between the vapor phase of chamber 40 and the bottom portion of the condenser chamber 19. The arrangement is that the top end 50a of tube 50 penetrates the wall of the condenser chamber and is present inside the condenser chamber. An inlet tube 51 is present in top wall of bellows chamber 30. A flexible rubber or plastic tube 52 communicates between end 50a and inlet 51. The arrangement is that flexible tube 52 is long enough to travel with the top wall 30a during its upward and downward movements, as will be described. A one way valve 51a in inlet 51 allows vapor to enter chamber 30, but does not allow any exit of vapor from the chamber. A one way valve 50v in tube 50 in inlet 51 allows vapor to leave the vapor phase 45v through tube 50 but does not allow the entrance of vapor or liquid from tube 50. Another tube 54 communicates between the bottom of condenser container 19 and a bottom portion of container 40. The tube 54 thus forms a communication between liquid phase 171 of chamber 17, and the liquid phase 451 of chamber 40. As can be seen in the drawing tube 54 travels through the bottom wall of tank 11 and roof 10. Proper sealing material through the penetration areas is used to avoid leakage. The tube 54 is convoluted in order to provide relatively large heat exchange surfaces. The opening of tube 54 into chamber 40 is controlled by a floatation valve 57. The valve allows the entrance of fluid into chamber 40 through tube 54, but does not allow the entrance of liquid to the tube 54 from chamber 40. The floatation valve is controlled by the level of liquid 451 of liquid 45, so that it allows liquid to enter chamber 40, through tube 54, only when the liquid level 451 reaches a predetermined low level. Attached to ceiling 10 is a fan 60. The fan is placed where it can best distribute air from the vicinity of chamber 40 to other room areas.

Present on the bottom surface of tank 11 are electric heating coils 70. The coils function as a back up system on cloudy days or hot nights as will be described. The coils are connected by standard electric connections to an existing household electric system which may include an electric switch and thermostate (not shown). The outside surfaces of chamber 19 are coated with a wick like material 19w. The wick is connected to a source of water (not shown), which may be turned on when required. The wick helps to spread of water on the outside surfaces of chamber 19. The water cools the surfaces by evaporation. This functions as another back up system to enhance the temperature differential between the chambers when direct solar energy is not sufficient.

The operation of the solar air conditioner is as follows. Water 13 in tank 11 is heated by a solar flat plate collector. The hot water transfers heat to immersed evaporator chamber 17. In contrast, the condenser chamber 19 is present outside the hot water and is shielded from direct sunlight by canopy 21. This raises the temperature of the evaporator chamber 17 to above the temperature of condenser chamber 19. The heated evaporator chamber heats liquid 18 in the evaporator chamber. The heated liquid evaporates to form vapor phases above the liquid levels 18a and 18b. The vapor above liquid level 18a accumulates in the heated evaporator chamber 17, while the vapors above liquid level 18b accumulates in the relatively cold condenser chamber 19. The vapor in the condenser chamber 19, loses heat through the relatively cold walls of the condenser chamber, and re-condenses in part into a liquid. In contrast, the temperature of the vapor in the evaporator chamber, above liquid level 18a, remains high because of the continuous transfer of heat from water 13 into the chamber. The temperature differential between the chambers causes the vapor pressure above liquid level 18a to be higher than the vapor pressure above liquid level 18b. This larger vapor pressure above liquid level 18a causes the liquid 18 to leave evaporator chamber 17 to enter tube 20. This causes the liquid level 18b in tube 20 to rise above the liquid level 18a in the evaporator chamber. As the liquid level in tube 20 rises it accumulates in inter-space 26 and exerts a buoyant force upon float 25. In order for the float to rise the buoyant force upon the float must exceed the resistance to the upward movement of the float provided by the weight of the float and the resistance provided by the top wall 30a of bellows chamber 30. When the buoyant force upon float 25 exceeds the resistance to the float's upward movement the float will rise in response to the liquid level in inter-space 26. As the float rises it pushes top wall 30a of bellows chamber 30 upward. Since the bottom wall of the bellows chamber is immobile the bellows chamber can not move from its fixed position in tube 20 and only top wall 30a moves upward in response to the upward movement of the float. This changes the position of bellows chamber 30 from a folded to an extended position. This increases the volume of bellows chamber 30. This creates a vapor vacuum in bellows chamber 30. The vacuum then draws vapor from the vapor phase 40v, of heat exchange coils 42, through tubes 50, 51, and 52, into bellows chamber 30.

As float 25 rises in response to the liquid level in tube 20 it raises valve control rod 39. When the rod 39 reaches a predetermined high level, it opens valve 37a. When this occurs a communication between vapor phases of chambers 17 and 19 is established. This causes vapor to leave evaporator chamber 17 to enter the condenser chamber 19 through tube 37. The vapor pressure differential between chambers 17 and 19 which caused the liquid levels to rise in tube 20 will thus be canceled. This causes the liquid which has entered tube 20 to flow back to evaporator chamber by force of gravity. When this occurs the buoyant force which has raised float 25 disappears and the float returns to its initial low level. This abolishes the upward pressure exerted by float 30 upon the top wall 30a of bellows chamber 30. The weight of float 25 then pulls top wall 30a to its initial low position. The contents of the bellows, such as any vapor or liquid which have entered the bellows chamber are pushed out of the chamber, through outlet tube 33 and valve 33a, into tube 20. The vapor then mixes with the vapors in chambers 17 and 19. As float 25 descends it pulls valve control rod 39 downward. When valve control 39 reaches a predetermined low level, it closes valve 37. When this occurs the communication between the vapor phases of chambers 17 and 19 is closed. This re-establishes the separation between the vapor phases of chambers 17 and 19. The temperature differential between the chambers results in the development of a new vapor pressure differential between the chambers. This causes new water 28 to enter tube 20 to exert a buoyant force upon float 25. and renew the cycle of operation.

The vapor which enters the condenser chamber 19 re-condenses into a liquid because of the relatively low temperature in the chamber. The liquid then drains back into the evaporator chamber, through tube 20 by force of gravity. The removal of vapor from cooling chamber 40 lowers the vapor pressure in the chamber. This induces an evaporation or boiling of liquid 45 in chamber 40 to replace the removed vapor. The evaporation of the low boiling point liquid 45 causes a cooling of the liquid. The cold liquid cools the coils of chamber 40. The coils then cool the air in their vicinity. The cold air is distributed to other room areas by diffusion, or through the action of fan 60. As the evaporation continues the liquid in chamber 40 is gradually transferred by the evaporation and re-condensation processes to chamber 17. This reduces the level of the liquid 451 in chamber 40. When the level reaches a predetermined low level floatation valve 57 opens pipe 54 and liquid is transferred into chamber 40 through pipe 54. This raises the liquid level in chamber 40. When the liquid reaches a predetermined high level the floatation valve 57 closes pipe 54, and blocks the entry of liquid to chamber 40 through the pipe. The liquid is partially cooled before it enters chamber 40 through loss of heat from the convoluted surfaces of pipe 54.

On cloudy hot days when direct solar energy is not readily availabe, or at night, the cooling system will be powered by the hot water stored in tank 11. When the water has cooled electric coils 70 will be activated to re-heat the water in tank 11. The surfaces of condenser chamber 19 may likewise be wetted to enhance the operating temperature differential between chambers 17 and 19.

NUMERICAL EXAMPLES

The temperatures in the evaporator and condenser chambers will vary according to ambient temperature and natural variations in the intensity of solar radiation. The dimensions of the components may vary according to the cooling needs, the natural range of ambient temperatures, and the architecture of the building cooled. The following are a few random numerical examples out of practically unlimited possible variations. It is understood, that depending on the conditions other dimensions may be used.

The float is in the form of a cube with dimensions of 1 cubic meter and a weight of 50 kg. In its extended position the bellows chamber is a cube of dimensions of 30 cm with a cross section of 900 square cm. In its folded position the bellows chamber has a cross section of 30×30 cm and a height of 5 cm. The top wall travels a distance of 25 cm upward in order to reach its upper limit of travel to open valve 51a. The amount of the buoyant force upon the float would be equal to the weight of the liquid which can fill the volume of the float which is immersed in the water. When the float is prevented from moving upward, the liquid which enters tube 20 rises in inter-space 26 and immerses an increasing volume of the float in the liquid. Therefore, the buoyant force exerted upon the float 25 will increase with the increase of the level of the liquid in inter-space 26. The cross section of the float is 10,000 square cm. For each cm of the float's height which is immersed in the water there is, therefore, a buoyant force of 10 kg upon the float. The level of the water in inter-space 26 and tube 20 will be self adjusting according to the energy needs of the air conditioner. The following are numerical examples of the operation of the air conditioner under different temperatures.

EXAMPLE 1

The temperature of the water in the evaporator chamber is 70 degrees centigrade with a vapor pressure of 233.7 mm Hg. The temperature of the vapor in the vapor phase of the condenser chamber is 50 degrees centigrade, with a vapor pressure of 92.51 mm Hg, or 0.30 kg per square cm. The vapor pressure differential between the evaporator and the condenser chamber is, therefore, 141.19 mm Hg. This is capable of lifting a column of water of to a height of up to 192 cm in the vertical tube.

The temperature of the vapor in the heat exchange coils is 10 degrees centigrade with a vapor pressure of 9.2 mm Hg, or 0.0136 kg per square cm. The vapor pressure difference between the vapor phases in heat exchange coils and the condenser chamber is therefore 0.29 kg per square cm. Thus, when the top wall 30a of the bellows chamber is pulled upward the top wall will encounter a resistance of 0.29 kg per square cm. Therefore, a buoyant force exceeding 0.29 kg per square inch would be required to pull the top wall of the bellows chamber upward. The total resistance of the top wall of the bellows chamber to upward movement of the bottom wall will, therefore, be 261 kg. The float will therefore not rise until the inter-space liquid reached a height of 31.1 cm (this includes a rise of 5 cm to overcome the resistance provided by the weight of the float and an additional rise of 26.1 cm to overcome the resistance provided by the vapor pressure differential between the heat exchange coils and the condenser chamber). Another increase of 25 cm of the water level in the inter-space will be required to lift the float and the top wall of the bellows chamber to their upper limit of travel. The upper wall of the bellows chamber will then open valve 51a to renew the cycle of operation as described. The total rise of the liquid required to obtain a travel of top wall 30a to its upper limit is therefore 61.1 cm during the operation of the air conditioner under the above conditions.

EXAMPLE 2

The temperature of the water in the the evaporator chamber is 60 degrees centigrade with a vapor pressure of 140.38 mm Hg. The temperature of the vapor in the vapor phase of the condenser chamber is 45 degrees centigrade with a vapor pressure of 71.88 mm Hg, or 0.10 kg per square cm. The vapor pressure differential between the evaporator and the condenser chamber is, therefore, 68.5 mm Hg. This will lift a column of water up to 97.76 cm in vertical tube 20.

The temperature of the vapor in the heat exchange coils is 10 degrees centigrade with a vapor pressure of 9.2 mm Hg, or 0.0136 kg per square cm. The vapor pressure difference between the vapor phases in heat exchange coils and the condenser chamber is therefore 0.09 kg per square cm. Thus, when the top wall 30a of the bellows chamber is pulled upward the top wall will encounter a resistance of 0.09 kg per square cm. Therefore, a buoyant force exceeding 0.09 kg per square inch would be required to pull the top wall of the bellows chamber upward. The total resistance of the top wall of the bellows chamber to upward movement of the bottom wall will, therefore, be 81 kg. The float will therefore not rise until the inter-space liquid reached a height of 13.1 cm (this includes a rise of 5 cm to overcome the resistance provided by the weight of the float and an additional rise of 8.1 cm to overcome the resistance provided by the vapor pressure differential between the heat exchange coils and the condenser chamber). Another increase of 25 cm of the water level in the inter-space will be required to lift the float and the top wall of the bellows chamber to their upper limit of travel. The upper wall of the bellows chamber will then open valve 51a to renew the cycle of operation as described. The total rise of the liquid required to obtain a travel of top wall 30a to its upper limit is therefore 38.1 cm during the operation of the air conditioner during the above conditions.

EXAMPLE 3

The temperature of the water in the the evaporator chamber is 50 degrees centigrade with a vapor pressure of 92.51 mm Hg. The temperature of the vapor in the vapor phase of the condenser chamber is 40 degrees centigrade with a vapor pressure of 55.32 mm Hg, or 0.056 kg per square cm. The vapor pressure differential between the evaporator and the condenser chamber is, therefore, 23.5 mm Hg. This can lift a column of water to a height of 50.58 cm in the vertical tube above the level of the water in the evaporator chamber.

The temperature of the vapor in the heat exchange coils is 10 degrees centigrade with a vapor pressure of 9.2 mm Hg, or 0.0136 10 kg per square cm. The vapor pressure difference between the vapor phases in heat exchange coils and the condenser chamber is therefore 0.042 kg per square cm. Thus, when the top wall 30a of the bellows chamber is pulled upward the top wall will encounter a resistance of 0.042 kg per square cm. Therefore, a buoyant force exceeding 0.042 kg per square inch would be required to pull the top wall of the bellows chamber upward. The total resistance of the top wall of the bellows chamber to upward movement of the bottom wall will therefore be 37.8 kg. The float will therefore not rise until the inter-space liquid reached a height of 8.78 cm (this includes a rise of 5 cm to overcome the resistance provided by the weight of the float and an additional rise of 3.78 cm to overcome the resistance provided by the vapor pressure differential between the heat exchange coils and the condenser chamber). Another increase of 25 cm of the water level in the inter-space will be required to lift the float and the top wall of the bellows chamber to their upper limit of travel. The upper wall of the bellows chamber will then open valve 51a to renew the cycle of operation as described. The total rise of the liquid required to obtain a travel of top wall 30a to its upper limit is therefore 33.78 during the operation of the air conditioner.

EXAMPLE 4

The temperature of the condenser chamber is 30 degrees centigrade and the temperature of the evaporator chamber is 40 degrees cendtigrade. The corresponding vapor pressures in the condenser and evaporating chambers are 31.82 mm Hg (0.047 kg/square cm) and 55.3 mm Hg (0.082 kg/square cm), respectively. This results in a vapor pressure differential of 23.5 mm Hg. This can push a column of water to a height of 31.96 cm in the vertical tube 20 above the level of the water in the evaporator chamber.

The temperature of the vapor in the heat exchange coils is 10 degrees centigrade with a vapor pressure of 9.2 mm Hg, or 0.0136 kg per square cm. The vapor pressure difference between the vapor phases in heat exchange coils and the condenser chamber is therefore 0.033 kg per square cm. Thus, when the top wall 30a of the bellows chamber is pulled upward the top wall will encounter a resistance of 0.033 kg per square cm. Therefore, a buoyant force exceeding 0.033 kg per square cm would be required to pull the top wall of the bellows chamber upward. The total resistance of the top wall of the bellows chamber to upward movement of the bottom wall will therefore be 29.7 kg. The float will therefore not rise until the inter-space liquid reached a height of 7.97 cm (this includes a rise of 5 cm to overcome the resistance provided by the weight of the float and an additional rise of 2.97 cm to overcome the resistance provided by the vapor pressure differential between the heat exchange coils and the condenser chamber). Another increase of 25 cm of the water level in the inter-space will be required to lift the float and the top wall of the bellows chamber to their upper limit of travel. The upper wall of the bellows chamber will then open valve 51a to renew the cycle of operation as described. The total rise of the liquid required to obtain a travel of top wall 30a to its upper limit is therefore 32.97 cm during the operation of the air conditioner.

While the embodiment of FIG. 1 has shown a bellows chamber with a mobile top wall and an immobile bottom wall, other means may be used to vary the position of the bellows without departing from the essence of the invention. For example, the bellows chamber may contain an immobile top wall and a mobile bottom wall, and a spring bias which keeps the float in an extended position. The bottom wall may then be pushed upward by the rising float to change the position of the float from an extended to a folded position. The spring bias of the bellows will then return the bellows to an extended position when the float returns to its initial low position.

Figure 2:
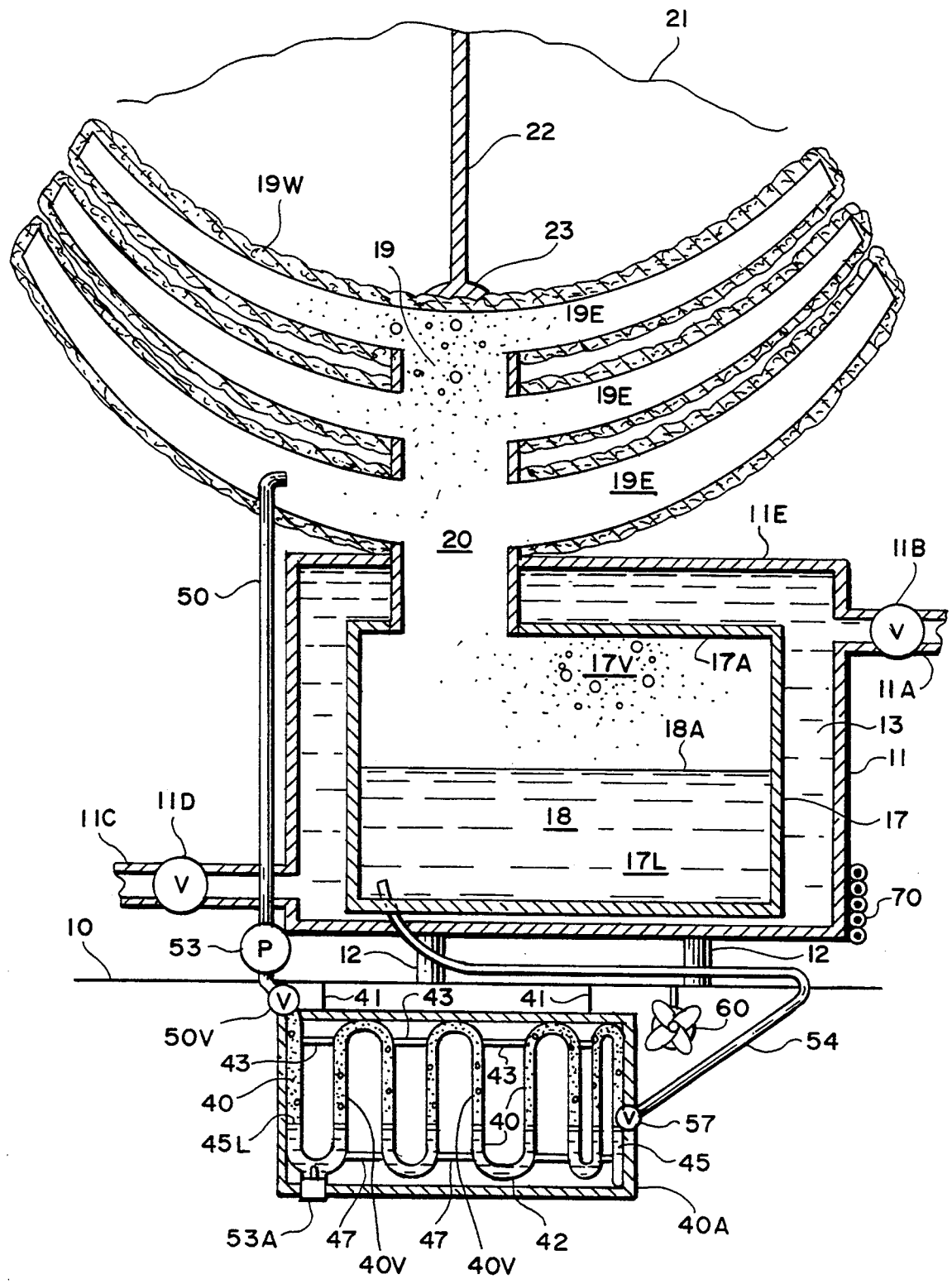
FIG. 2 is a cross-sectional view of a preferred embodiment of a combined electric and solar cooling system.

FIG. 2 illustrates an embodiment of the invention which uses an electric powered pump instead of a solar float mechanism. Components which are similar to those described in FIG. 1 have been given similar numbers. Referring to FIG. 2 there is shown water tank 11. The tank is supported by legs 12, on roof 10. The tank is adapted to receive hot water 13, which has been heated by standard solar flat plate collectors (not shown). The tank accumulates solar heated water and thus serves as a storage device for solar energy as will be described. To that end the tank is coated with an insulating material (not shown) to prevent the loss of heat from the tank. Inlet 11a and valve 11b connect water in tank 11 with a central water supply, and outlet 11c and valve 11d connect water in tank 11 with the home water supply.

Immersed in the hot water of the solar storage tank 11 is a chamber 17. The chamber functions as an evaporator chamber as will be described. Present inside chamber 17 is a low boiling point liquid 18 such as water under an air vacuum. The liquid defines a liquid level 18a, and divides evaporator chamber 17 into a liquid chamber portion 171 and a vapor chamber portion 17v.

Present on top of evaporator chamber is tube 20. The arrangement is that tube 20 penetrates the top wall of chamber 17 into chamber 17. The length of tube 20 is such that its upper end extends to a level which is higher than the upper wall of chamber 17, while its lower end opens into the vapor phase 17v close to the top surface of chamber 17. The upper open end of tube 20 forms a support to a condenser chamber 19 which is present above chamber 17. Thus tube 20 forms a communication between condenser chamber 19 and evaporator chamber 17. The tube 20 forms a tight fit with the penetrated walls. Proper sealing material such as solder may be used.

The condenser chamber is divided into petal shaped compartments 19e. The insides of all compartments 19e drain into tube 20. The spacings between compartments 19e are designed to allow for a direct contact of the compartments with ambient air. The walls of chamber 19 are made of good heat conducting materials, such as aluminum to allow for maximal transfer of heat from the walls to the outside environment. Present on top of condenser chamber 19 is a canopy 21. The canopy is designed to minimize the exposure of condenser chamber 19 to direct sunlight. The canopy is fixed to the top of condenser chamber 19 by rod 22, which is glued to the top surface of chamber 19 through rod base 23.

Present underneath roof 10, on an underside of a ceiling of the room cooled by the solar air conditioner, is a cooling chamber 40. The chamber is attached to the room ceiling by rods 41 which are screwed to the ceiling. The rods provide an air space between chamber 40 and the ceiling. The arrangement is that chamber 40 is shaped to provide a high surface to volume ratio. For example, chamber 40 may assume a shape of multiple inter-communicating coils 42 in frame 40a. Top conduits 43 provide a communication between the top portions of the coils. Bottom conduits 47 communicate between the bottom portions of the coils of chamber 40.

Present inside container 40 is a low boiling point liquid 45. The type of liquid used is similar to the liquid used in the evaporator chamber 17. This is required because of the intermixing of the liquids of the chambers during the operation of the air conditioner, as will be described. The liquid level 451 of liquid 45 defines a liquid phase 401, and a vapor phase 40v in chamber 40. A tube 50 communicates between the vapor phase of chamber 40 and the bottom portion of the condenser chamber 19. A one way valve 50v in pipe 50 allows vapor to leave the vapor phase 45v through tube 50 but does not allow the entrance of vapor or liquid into chamber 40. A pump 53 pumps vapor from 45v into tube 50 and condenser chamber 19. A thermostat 53a in heat exchange coils 40 turns the pump off when the temperature in the coils 40 descends to a a predetermined value, and turns the pump on when the temperature in coils 40 exceed a pre-determined value. Another tube 54 communicates between the bottom portion of condenser container 19 and a lower portion of a side wall of container 40. The tube 54 thus forms a communication between liquid phase 171 of chamber 17, and the liquid phase 451 of chamber 40. As can be seen in the drawing tube 54 travels through the bottom wall of tank 11 and roof 10. Proper sealing material through the penetration areas is used to avoid leakage. The tube 54 is convoluted in order to provide relatively large heat exchange surfaces. The communication through tube 54 is controlled by a floatation valve 57. The valve allows the entrance of fluid into chamber 40 through tube 54, but does not allow the entrance of liquid to the tube 54 from chamber 40. The floatation valve is controlled by the level of liquid 451 of liquid 45, so that it allows liquid to enter chamber 40, through tube 54, only when the liquid level 451 reaches a predetermined low level. Attached to ceiling 10 is a fan 60. The fan is placed where it can best distribute air from the vicinity of chamber 40 to other room areas.

Present on the bottom surface of tank 11 are electric heating coils 70. The coils function as a back up system for heating the water in tank 11 when direct solar energy is not available. The coils are connected by standard electric connections to an existing household electric system which include an electric switch and a thermostat (not shown). The outside surfaces of chamber 19 are coated with a wick like material 19w. The wick is connected to a source of water (not shown), which may be turned on when required. The wick helps the spread of water on the outside surfaces of chamber 19. The water cools the surfaces by evaporation. This functions as another back up system to enhance the temperature differential between the chambers when direct solar energy is not sufficient.

The operation of the solar air conditioner is as follows. Water 13 in tank 11 is heated by a solar flat plate collector. The hot water transfers heat to immersed evaporator chamber 17. In contrast, the condenser chamber 19 is present outside the hot water and is shielded from direct sunlight by canopy 21. This raises the temperature of the evaporator chamber 17 to above the temperature of condenser chamber 19. The temperature differential between the chambers will increase the vapor pressure in the evaporator to above vapor pressure in the condenser chamber. This will cause the vapor in the evaporator chamber to leave the evaporator chamber and to enter the condenser chamber. The vapor which enters the condenser chamber 19 re-condenses into a liquid because of the relatively low temperature in the chamber. The liquid then drains back into the evaporator chamber, through tube 20 by force of gravity.

When the temperature in the heat exchange coils 40 is below a pre-determined level thermostat 53a activates pump 53. The pump removes vapor from heat exchange coils 42, and transfers the vapor into condenser chamber 19. The removal of vapor from the coil lowers the vapor pressure in the coils. This induces an evaporation or boiling of liquid 45 in coils 42 to replace the removed vapor. The evaporation of the low boiling point liquid 45 causes a cooling of the liquid. The cold liquid cools the coils 42 of chamber 40. The coils then cool the air in their vicinity. The cold air is distributed to other room areas by diffusion, or through the action of fan 60. As the evaporation continues the liquid in chamber 40 is gradually transferred by the evaporation to chamber 17. This reduces the level of the liquid 451 in chamber 40. When the level reaches a predetermined low level, floatation valve 57 opens pipe 54 and liquid is transferred into chamber 40 through pipe 54. This raises the liquid level in chamber 40. When the liquid reaches a predetermined high level the floatation valve 57 closes pipe 54, and blocks the entry of liquid to chamber 40 through 54. The liquid is partially cooled through loss of heat from the convoluted surfaces of pipe 54.

On cloudy hot days when direct solar energy is not readily availabe, or at night, the cooling system will be powered by the hot water stored in tank 11. When the water has cooled electric coils 70 will be activated to re-heat the water in tank 11. The surfaces of condenser chamber 19 may likewise be wetted to obtain, or to enhance, the temperature differential between chambers 17 and 19.

It is understood that the embodiments illustrated in FIG. 1 and 2 are only examples of many possible embodiments which are within the scope of the claims. For example, while the invention described in the embodiments of FIGS. 1 and 2 utilized water under a vacuum as a low boiling point refrigerant other low boiling point refrigerants such as methylene chloride or a freon may be used without departing from the spirit of the invention. Other means, besides immersion in a solar hot water storage tank, may be used to heat the liquid in the evaporator chamber. For example, the liquid in the evaporator chamber may communicate directly with solar flat plate collectors. The liquid heated in the solar flat plate collectors will then diffuse directly into the evaporator chamber, instead of to a solar hot water storage tank. Electric means may be used not only on a standby basis, but may also be used as standard means to power the cooling system. Cooling by surface evaporation of water from the conden ser chamber may likewise be used as standard means especially for the embodiment described in FIG. 2.

What is claimed is:

1. A hot water cooling system, consisting of a chamber adapted to act as an evaporator chamber,
   a low boiling point liquid in said evaporator chamber,
   another chamber adapted to act as a condenser chamber,
   means to obtain a temperature differential between the evaporator and condenser chambers, wherein the temperature in said evaporator chamber exceeds the temperature in said condenser chamber,
   said temperature differential between the chamber resulting in a vapor pressure differential between the chambers, wherein the vapor pressure in said evaporator chamber exceeds the vapor pressure in said condenser chamber,
   a communication between said evaporator and said condenser chamber,
   means to open and close said communication between the chambers to cyclically change the vapor pressure differential between said evaporator and said condenser chambers,
   a moving member adapted to respond to said vapor pressure differential changes between the chambers,
   pump means,
   a linkage between said punp means and said moving member,
   said linkage adapted to activate said pump during the movements of said moving member,
   a heat exchange chamber containing a low boiling point liquid, wherein said liquid evaporates and absorbs heat from its environment,
   said low boiling point liquid in said heat exchange chamber being of the same kind as said low boiling point liquid in said evaporator chamber,
   said pump means adapted to transfer vapor from from said heat exchange chamber to said condenser chamber to combine the vapors of said condenser and heat exchange chambers,
   means to re-condense said vapors into liquid through said temperature differential between said condenser and said evaporator chambers,
   and means to return said re-condensed liquid to said heat exchange chamber.

2. The invention as described in claim 1 wherein said moving member is a liquid changing its level in response to said vapor pressure differential between the chambers.

3. The invention as described in claim 2 wherein said moving member includes a float rising with said moving liquid.

4. The invention as described in claim 2 wherein means to obtain at temperature differential between said chambers includes means to wet the surface of said cold chamber with water to selectively cool said cold chamber by surface evaporation of the water.

5. The invention as described in claim 1 wherein said means to obtain a temperature differential between the chamber includes means to transfer heat from a solar flat plate collector to said hot chamber.

6. The invention as described in claim 1 wherein said means to obtain a temperature differential between the chamber includes a canopy which selectively shields said condenser chamber from solar radiation.

7. The invention as described in claim 1 wherein said means to obtain a temperature differential between the chamber includes electric means to selectively heat said evaporator chamber.

8. The invention as described in claim 1 wherein said pump means includes a bellows chamber.

9. The invention as described in claim 1 and including means to store heat energy.

10. The invention as described in claim 8 wherein means to store heat energy includes a hot water tank adapted to collect water heated by a solar flat plate collector.

11. The invention as described in claim 1 and including means to wet the surface of said condenser chamber to enhance said temperature differential between said evaporator and said condenser chambers.

* * * * *